United States Patent Office 3,438,920
Patented Apr. 15, 1969

3,438,920
PROCESS FOR PREPARATION OF OIL
EXTENDED POLYISOPRENE LATEX
Walter M. Halper, Palos Verdes Peninsula, Calif., and
Fred Dudley Moss, Greenwich, Conn., assignors to Shell
Oil Company, New York, N.Y., a corporation of
Delaware
No Drawing. Filed Aug. 8, 1966, Ser. No. 570,751
Int. Cl. C08g 51/34, 11/22
U.S. Cl. 260—23.7
3 Claims

ABSTRACT OF THE DISCLOSURE

This invention is a process for preparing oil extended polyisoprene latices. An unemulsified extending oil is added to a polyisoprene latex, and the latex containing oil is processed in a shear homogenizer at elevated temperature and pressure. An emulsifying agent is added to the oil extended latex. The oil extended polyisoprene latex may be utilized as carpetbacking material.

---

This invention relates to oil-extended aqueous polyisoprene latices which may suitably be employed for certain applications in place of the corresponding non-extended latices. More particularly, the invention relates to preparation of oil-extended aqueous polyisoprene latices which are especially useful in carpetbacking applications.

Specifically, the invention provides an economical carpetbacking material comprising an oil-extended aqueous latex of polyisoprene wherein the particles of the latex are homogeneous and each contain both oil and polymer. The oil-extended latices prepared according to the method of the invention provide non-separating oiled latices which perform in the area of carpetbacking applications as well as the corresponding non-extended latices.

The use of oil in processing and compounding latices is recognized in the art. Various methods of incorporating oil into latices are described in the literature. One such method consists of adding the oil as a separate oil-in-water emulsion to the latex or the oil can be added directly to the latex and the mixture stirred. Although oil added by these methods appears visually to be homogeneously dispersed, oil separation does occur on standing or centrifugation. In latices prepared by these methods it would appear that the oil and polymer particles exist side-by-side in the latex rather than as homogeneous particles, each one of which contains both oil and polymer. Phase separation of the oiled latex presents serious problems during storage and shipping of the product and in some applications it leads to the separated oil staining the carpeting. On the other hand, it would be highly desirable to provide a suitable oiled latex not subject to phase separation for carpetbacking applications or other purposes since the oiled latex is significantly less expensive than the corresponding non-oiled latex.

It is therefore an object of the invention to provide a method of preparing non-separating oiled polyisoprene latices wherein the particles of the latices are homogeneous and each contains both oil and polymer. It is a further object of the invention to provide oiled polyisoprene latices which provide more economical carpetbacking materials than the materials presently employed. These and other objects of the invention will be apparent from the following detailed description.

It has now been found that these and other objects may be accomplished by the process of the present invention, which comprises adding an extending oil directly to an aqueous polyisoprene latex and shear-homogenizing the resulting mixture. Additional emulsifying agent may be added prior to homogenization or subsequent thereto.

While butadiene, styrene-butadiene rubber latices, carboxylated styrene-butadiene rubber latices and polyisoprene latices are candidates for carpetbacking materials, only the latter possess the quick grab and wet strength qualities which are desired in carpetbacking materials.

The preparation per se of polyisoprene latices is known in the art and forms no part of the invention. A suitable preparation may consist of, for example: forming polyisoprene by solution polymerization using a lithium based catalyst such as a lithium alkyl; emulsifying a mixture of polymer solution, water and emulsifying agents; and removing the solvent by vaporization or other suitable techniques. The polyisoprene latices which are preferred for the preparation of oiled latices in accordance with the present invention will include the following properties:

pH _____ 10–11.5
Particle size _____ 1.0–2.0μ
Soap concentration, parts per hundred parts
  rubber _____ 1.0–1.2
Solids content, percent _____ 60–70
Brookfield viscosity (measured at 20 r.p.m. with
  a No. 1 spindle) _____cps__ 75–200

It will be appreciated, however, that polyisoprene latices which have properties wherein the ranges are different from those expressed above may also be employed, for example, a latex having a solids content of 50% and a viscosity of 50 cps.

Extending oils include the paraffinic, naphthenic and aromatic type oils and may be conveniently classified with reference to their VGC (viscosity-gravity constant). Those which are predominantly aromatic hydrocarbon concentrates have VGC values above 0.905; those which are predominantly paraffinic or naphthenic have VGC values below 0.905. Suitable extending oils for use in the present invention are those which have a VGC value of from 0.80 to 0.95, and most preferably from 0.81 to 0.89.

A number of suitable extending oils for use in the invention are listed in the chart below.

The process of preparing the oiled polyisoprene latices of the invention may be broadly stated as comprising adding an unemulsified extending oil of the type hereinbefore described to a polyisoprene latex and subjecting the resulting mixture to shear homogenization; additional emulsifying agent being added to the latex prior to, during or subsequent to oiling thereof, or at all of these times.

It was discovered that in carrying out the process certain variables must be controlled in order to provide an oiled latex having desirable properties and characteristics, especialy for carpetbacking applications. For example, the "High Speed Mechanical Stability" which is a measure of the relative stability of a latex is determined using a beverage mixer. In accordance with this test, a latex is diluted with distilled water to a total solids content of 55±0.2%; the latex is strained and 150±1 gram weighed into a container; temperature is ambient at the start of the test and is not controlled, i.e., it rises as mechanical energy is converted to heat. The container with the latex is then placed in the mixer at high speed and stirred until the end point is reached as indicated by the observation of fine lumps of coagulum on a spatula dipped into the latex. The time to the first observed coagulum is a measure of the stability of the latex.

It was found that the mechanical stability of oiled latex prepared by homogenizing a mixture of oil and latex was less than that of the unoiled latex. This decrease in mechanical stability is expected since the oil added increases the interfacial surface which the soap must protect. The reduction in stability also extends to the addition of pigments and fillers to the oiled latex. It was found that stability of the oiled latex can be restored, however, by addition of more emulsifying agent, i.e., soap, to the system, preferably added to the latex after oiling.

The quantity of additional emulsifying agent which is added to the system is that required to restore the stability of the oiled latex to the level of the feed latex. This quantity, therefore, depends upon the identity and concentration of the agent in the stable feed latex which has a mechanical stability of at least 25 minutes as determined by the above described test. Generally, the quantity will vary from 0.1 to 0.50 parts per hundred parts rubber; for example, a latex having the properties of the preferred latex described hereinbefore requires approximately 0.25 additional parts potassium soap of disproportionated rosin per 100 parts polyisoprene rubber present in the feed latex to restore the mechanical stability of the oiled latex up to the level of the feed latex.

The extra soap has the added effect of lowering the coagulum susceptability. The coagulum content of a latex is determined according to A.S.T.M. specification D 1076–64; test 13 and is expressed in percent by weight of polymer. A measured sample is strained through a stainless steel sieve of standard mesh (80 B.S.); the residue is washed with dilute soap solution, dried and weighed.

A latex of relatively high viscosity is desirable for purposes such as carpetbacking applications, especially at the time of applying the latex to the carpeting. Incorporation of the oil into the latex by mere stirring, blending, agitating and the like does not result in an appreciable change in viscosity of the latex. The absence of a viscosity change in the oiled latices of these prior art procedures indicates that the oil is not finely dispersed and is probably not incorporated into each one of the well-protected latex particles. Shear homogenization, on the other hand, raises the viscosity to the approximate value desired, i.e., the oil raises the solids (non-aqueous) content of the latex. Surprisingly, however, shear homogenization does not substantially alter the particle size of the latex. The explanation is apparently that shear homogenization decreases the particle size of the rubber thereby providing more particles which are subsequently homogeneously dispersed with oil to provide particles of the size of the unoiled latex particles. It has also been discovered that the homogenization pressure and feed temperature affect the viscosity of the resulting oiled latex; an increase in either pressure and/or temperature increases the viscosity. Consequently, the preparation of oil extended polyisoprene latex in a shear homogenizer can be controlled within a selected viscosity range by manipulating the homogenizer pressure and/or temperature. Preferably, the feed temperature may range from 60° to 120° F. and the pressure from 100 to 7,000 p.s.i., although higher or lower ranges may be employed.

The preferred process of the invention takes into consideration the properties of the oiled latex including mechanical stability, viscosity, and freedom from coagulum, and comprises:

(1) Blending from 5 to 50 phr. of an extending oil and preferably 25 to 35, e.g., 33 phr., into the latex under mild agitation to permit equilibration of oil and latex. Any conventional stirring apparatus providing low shear mixing is suitable.

(2) Shear-homogenizing the blend at a pressure of from 100 to 7,000 p.s.i. (preferably 500–3,000) and temperature from 60 to 120° F. to provide an oiled polyisoprene latex in which substantially none of the oil will separate on either standing or centrifuging. A suitable homogenizer is, for example, the Manton-Gaulin homoge-

CHART

| Extending Oil Number | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| Viscosity: | | | | | | | | | | | | |
| SSU/100° F | 103 | 112 | 101 | 106 | 164 | 204 | 205 | 256 | 265 | 427 | 573 | 840 |
| SSU/210° F | 39.5 | 38.5 | 38.1 | 38.2 | 40.7 | 43.7 | 44.0 | 49.3 | 50.0 | 53.5 | 56.6 | 66.4 |
| Gravity, ° API | 32.2 | 25.5 | 24.3 | 22.0 | 19.8 | 23.4 | 23.0 | 29.6 | 29.2 | 25.6 | 22.5 | 20.5 |
| Specific Gravity/60° F | 0.8644 | 0.9013 | 0.9082 | 0.9218 | 0.9352 | 0.9135 | 0.9159 | 0.8783 | 0.8805 | 0.9007 | 0.9188 | 0.9309 |
| Pounds/Gallon | 7.198 | 7.505 | 7.563 | 7.676 | 7.788 | 7.607 | 7.627 | 7.314 | 7.332 | 7.500 | 7.651 | 7.752 |
| Color, ASTM | 0.5 | 0.5 | L1.5 | L1.5 | 6 | 2.0 | L1.5 | 0.5 | 1.0 | L2.0 | L2.0 | L2.0 |
| Flash Point, c.o.c., ° F | 380 | 340 | 335 | 330 | 345 | 360 | 375 | 430 | 430 | 410 | 410 | 430 |
| Pour Point, ° F | 10 | −45 | −30 | −40 | −35 | −25 | −20 | 10 | 10 | −35 | −10 | 0 |
| Volatility, 22 Hrs/225° F., Percent w | 0.9 | 5.9 | 6.4 | 12.1 | 3.35 | 5.1 | 2.3 | 0.2 | 0.2 | 0.86 | 0.9 | 0.3 |
| Neutralization No., mg. KOH/g | 0.025 | 0.01 | 0.01 | 0.03 | 0.025 | 0.05 | 0.01 | 0.01 | 0.01 | 0.025 | 0.025 | 0.01 |
| Distillation, ° F.: | | | | | | | | | | | | |
| IBP | 642 | 596 | 566 | 564 | 628 | 595 | 610 | 720 | 719 | 710 | 718 | 635 |
| 5% | 674 | 618 | 625 | 594 | 642 | 651 | 645 | 752 | 754 | 745 | 750 | 726 |
| 10% | 682 | 626 | 631 | 603 | 656 | 670 | 680 | 760 | 762 | 757 | 760 | 766 |
| 50% | 704 | 662 | 693 | 650 | 686 | 760 | 745 | 820 | 820 | 810 | 813 | 850 |
| 90% | 744 | 720 | 788 | 751 | 736 | 840 | 815 | 875 | 879 | 865 | 868 | 925 |
| Aniline Point, ° F | 210 | 170 | 157 | 145 | 136 | 175 | 165 | 222 | 220 | 209 | 185 | 183 |
| Viscosity-Gravity Constant | 0.818 | 0.862 | 0.872 | 0.888 | 0.896 | 0.868 | 0.871 | 0.820 | 0.822 | 0.839 | 0.861 | 0.872 |
| Refractive Index/20° C | 1.4740 | 1.4918 | 1.5030 | 1.5090 | 1.5195 | 1.5016 | 1.5080 | 1.4815 | 1.4834 | 1.4908 | 1.5000 | 1.5160 |
| Refractivity Intercept | 1.0436 | 1.0430 | 1.0507 | 1.0500 | 1.0537 | 1.0467 | 1.0519 | 1.0437 | 1.0450 | 1.0423 | 1.0424 | 1.0524 |
| UV Absorptivity at 260 m$\mu$ | 0.5 | 2.3 | 8.7 | 9.5 | 17.3 | 7.9 | 10.2 | 1.3 | 1.6 | 0.6 | 4.9 | 13.5 |
| Molecular Analysis, Clay-Gel, percent w.: | | | | | | | | | | | | |
| Asphaltenes | 0 | 0 | 0 | 0 | 0 | 0 | 0 | 0 | 0 | 0 | 0 | 0 |
| Polar Compounds | 0.2 | 0.6 | 2.0 | 2.3 | 4.5 | 1.7 | 2.2 | 0.2 | 0.4 | 0.3 | 1.1 | 4.1 |
| Aromatics | 12.1 | 29.4 | 42.8 | 44.1 | 47.4 | 38.0 | 45.0 | 20.2 | 19.9 | 15.1 | 37.4 | 46.4 |
| Saturates | 87.7 | 70.0 | 55.2 | 53.6 | 48.1 | 60.3 | 52.8 | 79.6 | 79.7 | 84.6 | 61.5 | 49.5 |
| Carbon Atom Analysis, percent: | | | | | | | | | | | | |
| Aromatic Carbon Atoms, $C_A$ | 2 | 9 | 19 | 22 | 26 | 15 | 20 | 4 | 5 | 3 | 8 | 21 |
| Naphthenic Carbon Atoms, $C_N$ | 36 | 46 | 33 | 38 | 35 | 40 | 31 | 34 | 33 | 44 | 47 | 29 |
| Paraffinic Carbon Atoms, $C_P$ | 62 | 45 | 48 | 40 | 39 | 45 | 49 | 62 | 62 | 53 | 45 | 50 | nizer in which one pass through the homogenizer is sufficient to provide latex particles which each consist of homogeneously distirbuted oil and polyisoprene rubber.

(3) Adding from 0.1 to 0.7 phr. of emulsifying agent to the oiled polyisoprene latex before or after step (2).

It will be recognized that shear-homogenization which is employed in the process of the invention is distinguished from mere mixing, agitating, blending and the like. Shear homogenization requires a special apparatus wherein the latex is forced through a small aperture at pressure differences ranging from 100 to 7,000 p.s.i. Shear homogenization of the oiled latex results in a physical change in the latex, e.g, viscosity is increased and the free soap content of the latex is depleted.

The non-separating oiled latices prepared according to the process of the invention possess the necessary stability, viscosity, low coagulum content, hot-cold storage stability and quick grab to provide excellent carpetbacking materials. Quick grab is an expression employed to describe whether or not a latex properly coagulates. A simple test for quick grab is performed by placing a drop of latex between two fingers of the hand, pressing and then extending the fingers. If the latex makes "legs" (strands), the latex has quick grab.

The oiled latices of this invention have excellent carpet-backing properties, such as tack; tuft lock, which refers to fastening of the tuft or loop into the carpet; flexibility of backing; and skrim adhesion, which relates to the strength of the carpet and is measured in p.l.i. (pounds per linear inch).

The oiled latex is applied to the back of the carpet by conventional techniques, such as with brushes or rolls with the aid of machinery; or if desired the operation could be accomplished by hand, to provide a coating thereon The coating, which usually contains fillers and curing agents may then be cured at room temperature or preferably at elevated temperatures, for example, temperatures up to about 300° F. and preferably at temperatures ranging from 200° to 250° F. for from 25 to 30 minutes. Any of the conventional polyisoprene curing agents may be employed such as sulfur together with conventional accelerators and activators.

The oiled latex of the present invention may, if desired, contain conventional additives, such as fillers, surfactants, curing agents, pigments, antioxidants, stabilizers and the like without deviating from the invention.

To illustrate the manner in which the invention may be carried out, the following examples are given. It is to be understood, however, that the examples are for purposes of illustration and the invention is not to be regarded as limited to any specific materials or apparatus. Unless otherwise specified the expression phr. has reference to parts per hundred parts rubber (cis 1,4-polyisoprene).

A general preparation for stable latices of cis 1,4-polyisoprene used as feed to the oiled latex process may be the following: Isoprene is polymerized by solution polymerization utilizing the "low pressure" polymerization methods wherein the polymerization catalyst may be a lithium-based catalyst such as a lithium alkyl, e.g., a lithium butyl. An organic diluent, e.g., a hydrocarbon such as mixtures of lower alkanes or alkenes such as amylene, or modifications thereof with cycloalkanes, is used both as solvent and diluent. The resulting polyisoprene has a cis 1,4-content of about 91% or higher and the solution contains from 5–20% by weight of elastomer.

A stable emulsion is then prepared according to conventional emulsification techniques by bringing together elastomer solution (cement), water and emulsifying agent. The amount of water in the total composition for emulsification may range from 30 to 300 parts per hundred parts by volume of cement, with amounts of 40–50 being preferred. The emulsifying agent is preferably added to the mixture being prepared for emulsification in the form of an aqueous solution or dispersion and desirably in concentrations in the order of 0.5 to 2% or 3% by weight based upon the eventual aqueous phase of the emulsion. Any of the emulsifying agents employed in the emulsion polymerization art may be employed. Preferably, the agents are alkali metal soaps, e.g., sodium or potassium soaps of $C_{12-20}$ monocarboxylic acids, such as rosin or fatty acids including stearic or oleic acids, and mixtures of the same. If desired, the agents may be formed in situ, for example, by adding the soap forming acid to the cement and adding the alkali metal hydroxide to the aqueous phase. The amount of soap is calculated to provide a stable emulsion and, thereafter, a latex in which each of the latex particles bears a monomolecular layer of soap.

The solvent is then stripped from the resulting stable aqueous emulsion by either flashing or by the so-called "foam-over" technique.

The stable latex is then concentrated to a solids content ranging from 60 to 70% by evaporation or by centrifugation.

EXAMPLE I

Preparation of oil extended latices

The latex used has the following properties: pH of 10.6; soap concentration of 1 phr.; particle size of from 1.4 to 1.6 microns; a solids content of 65.7%; and a viscosity of 145 cps.

Twenty phr. of oil designated as "8" in the chart of extending oils recited hereinbefore is added to the latex feed just described and passed through a pump mixer to provide a coarse dispersion of oil in latex. The resulting blend is then passed through a Manton-Gaulin shear homogenizer at 3,000 p.s.i. and 75° F. The resulting latex is comprised of homogeneous particles each consisting of oil and rubber. To the oiled latex is added 0.25 phr. potassium rosinate (25% by weight soap solids in aqueous dispersion) and passed through a pump mixer.

The above oiled latex preparation is repeated with the exception that in place of 20 phr. of oil, 25 and 33 phr. are used in each of two separate oiled latex preparations.

The latex colloidal properties are determined for each of the above-prepared oiled latices and compared with the corresponding unoiled latex. The results of these determinations are given in Table I.

TABLE I

| Sample Description | Solids (percent weight) | Brookfield Viscosity (CPW) | Surface Tension (dyne/cm.²) | Mechanical Stability | |
|---|---|---|---|---|---|
| | | | | Relative Visual (min.) | Coagulum Susceptibility (percent weight) |
| Unoiled Latex | 65.7 | 145 | | >30 | |
| Oiled Latex (20 phr.) | 69.5 | 520 | 45.5 | >30 | 0.036 |
| Oiled Latex* (25 phr.) | 70.5 | 520 | | 7.5 | 0.046 |
| Oiled Latex (25 phr.) | 70.1 | 520 | | >30 | 0.036 |
| Oiled Latex* (33.3 phr.) | 71.8 | 990 | | 7.5 | 0.124 |
| Oiled Latex (33.3 phr.) | 71.4 | 990 | | 22.5 | 0.055 |

*Addition of 0.25 phr. of the potassium resin soap to the latex after oiling and homogenization was omitted from these formulations.

It will be noted that in those samples wherein the additional soap was omitted after oiling the mechanical stability of oiled latex is substantially reduced and the coagulum content thereof increased; in those samples wherein additional soap was added to tthe oiled latex the coagulum content is low and the mechanical stability thereof is comparable to that of the unoiled latices. Low stability of the latex results in poor stability thereof toward pigments and fillers as well as greater coagulum content.

EXAMPLE II

This example compares the stability of oiled latices toward oil separation prepared according to the present invention and other techniques.

An oiled latex (sample 1) containing 20 phr. of oil is prepared according to the procedure of Example I, including the essential step of high pressure homogenizing of the oil-latex mixture.

Another oiled latex (sample 2) is prepared by adding 20 phr. of oil to the feed latex used in Example I and stirring the resulting mixture overnight. No high pressure homogenizing was used.

Another oiled latex (sample 3) is prepared by adding to the feed latex used in Example I an oil-dilute soap emulsion containing 20 phr. oil and 0.25 phr. potassium rosinate and stirring the resulting mixture overnight. The oil-soap emulsion is prepared in a Waring blender. Sample 4, an unoiled latex, is the feed latex of Example I.

Each sample is subject to centrifugation at 3200 times gravity for ten minutes and tested for stability. The results are given in Table II.

TABLE II.—STABILITY OF OILED ISOPRENE LATEX TOWARDS OIL SEPARATION

| Sample Preparation [1] | Stability to Centrifugation [2] | Stability to Static Settling |
| --- | --- | --- |
| Sample 1 | No phase separation | Stable. |
| Sample 2 | Oil-latex phase separation | Partial phase separation after two weeks. |
| Sample 3 | do | Phase separation within eight hours. |
| Sample 4 | Slight creaming | Stable. |

[1] The oil used to extend the samples contained a red dye to aid visual examination of phase changes.
[2] Samples were centrifuged at 3,200 times gravities for ten minutes.

EXAMPLE III

This example tests the performance in carpetbackings of the unoiled latex feed to Example I, and the oiled latex of Example I, containing 20 and 25 phr. of oil. To evaluate the polyisoprene latices they were compounded according to the following recipe. The carpet samples were coated with latex and cured as designated in the table below.

TABLE III

|  | Parts |
| --- | --- |
| Latex, total dry solids, polyisoprene+oil | 100 |
| Diisobutyl phenoxy polyethoxy ethanol (about 9–10 units) (Rohm and Haas, Triton X–100) | 1.0 |
| Styrenated phenol (Vanderbilts Agerite Spar) | 2.0 |
| Sulfur | 2.0 |
| Zinc oxide | 1.0 |
| Accelerators: | |
|   Zinc dibenzyl dithiocarbamate | 0.5 |
|   Heptaldehyde-aniline reaction product | 0.25 |
| McNamee clay | 200 |
| Sodium polyacrylate, (as required to achieve the proper viscosity) | 0.6–0.8 |

All insoluble ingredients, viz., sulfur, zinc oxide, etc. are added as stable dispersions.

TABLE IV.—PERFORMANCE IN CARPET COATING

| Coated Carpet Samples | Polyisoprene Latex-Oil Emulsion Blends, Percent Weight Ratios | | |
| --- | --- | --- | --- |
|  | 100/0 | 80/20 | 75/25 |
| A. Room Temperature Cure: | | | |
| 1. 200 phr. Load: | | | |
|   a. Tack (1 day) | Sticky | Sticky | Sticky. |
|   b. Tuft Lock | Fair | Fair | Fair. |
|   c. Flexibility | Light cracks | Light cracks | Light cracks. |
|   d. Stability (high speed) | 2.5 hrs | 2 hrs | 3 hrs. |
|   e. Skrim Adhesion (p.l.i.) | 4.8 | 2.8 | 2.0. |
| 2. 300 phr. Load: | | | |
|   a. Tack (1 day) | Sticky | Sticky | Sticky. |
|   b. Tuft Lock | Fair | Fair | Fair. |
|   c. Flexibility | Heavy cracks | Heavy cracks | Heavy cracks. |
|   d. Stability | >7 hrs | 1 hr | 1 hr. |
|   e. Skrim Adhesion (p.l.i.) | 3.5 | 1.6 | 1.5. |
| 3. 125 phr. Load: | | | |
|   a. Skrim Adhesion (p.l.i.) | 6.2 | 2.8 | |
| B. Oven Cure (30 min. at 212° F.): | | | |
| 1. 200 phr. Load: | | | |
|   a. Tack | None | None | None. |
|   b. Tuft Lock | Fair | Fair | Fair. |
|   c. Flexibility | No cracks | No cracks | Light cracks. |
|   d. Stability | 0 hrs | 0 hrs | 1.5 hrs. |
|   e. Skrim Adhesion (p.l.i.) | 4.3 | 3.5 | 4.0 |
| 2. 300 phr. Load: | | | |
|   a. Tack | None | None | None. |
|   b. Tuft Lock | Fair | Fair | Fair. |
|   c. Flexibility | Light cracks | Light cracks | Moderate cracks. |
|   d. Stability | 0 hrs | 0 hrs | 0 hrs. |
|   e. Skrim Adhesion (p.l.i.) | 4.8 | 4.2 | 2.0. |
| 3. 125 phr. Load: | | | |
|   a. Skrim Adhesion (p.l.i.) | 4.3 | 5.8 | |

We claim as our invention:

1. A process for preparing oil extended polyisoprene latices which comprises:

(a) adding to a polyisoprene latex having a pH of from 10 to 11.5, an average particle size of from 1.0 to 1.6 microns, a solids content of from 60 to 70%, and a soap concentration of from 1 to 1.2 parts per hundred parts polyisoprene from 5 to 50 parts per hundred parts polyisoprene of an unemulsified extending oil, said oil having a viscosity-gravity constant of from 0.8 to 0.9;

(b) passing the resulting latex containing oil through a shear homogenized at a pressure of from 100 to 7,000 p.s.i. and temperatures of from 60 to 120° F.; and (c) adding from 0.1 to 0.7 part additional emulsifying agent to the oil-extended latex obtained from step (b) and blending therewith; the resulting oil-extended polyisoprene latex having homogeneous particles each of which consists of oil and polyisoprene, said latex having a solids content of from 70 to 74%, a soap concentration of from 1.0 to 1.2 parts per hundred parts polyisoprene and oil, a Brookfield viscosity of from 500 to 1,000 cps., and a particle size of from 1.0 to 1.6 microns.

2. A process according to claim 1 wherein the emulsifying agent employed is selected from alkali metal soaps of $C_{12-20}$ monocarboxylic acids.

3. A process according to claim 1 wherein the shear homogenization is carried out at about 1,000 p.s.i. and about 75° F.

References Cited

UNITED STATES PATENTS

| | | | |
|---|---|---|---|
| 1,793,983 | 11/1922 | Whittelsey | 260—29.7 |
| 2,970,125 | 8/1956 | Smith et al. | 260—23.7 |

DONALD E. CZAJA, *Primary Examiner.*

D. J. BARRACK, *Assistant Examiner.*

U.S. Cl. X.R.

117—161; 260—33.6, 29.7